July 28, 1925.
F. H. WASHKO
1,547,700
RIM FOR PNEUMATIC TIRES AND CASINGS
Filed Jan. 10 1924
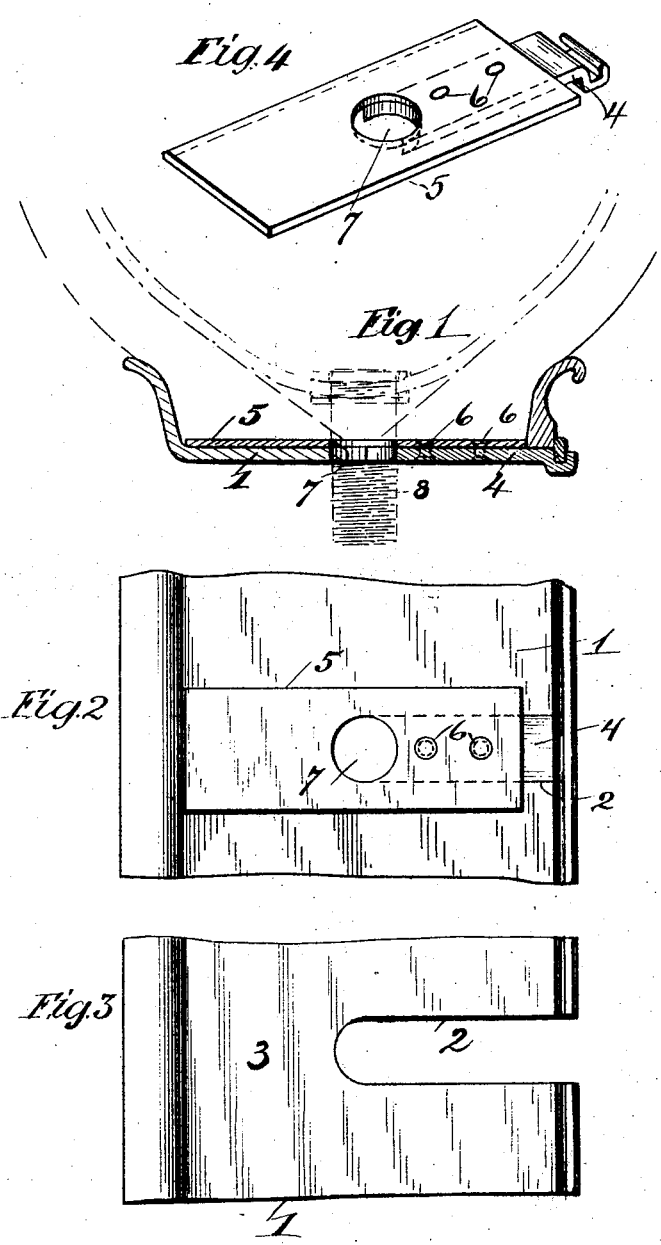

Patented July 28, 1925.

1,547,700

UNITED STATES PATENT OFFICE.

FRANK H. WASHKO, OF BEDFORD, OHIO.

RIM FOR PNEUMATIC TIRES AND CASINGS.

Application filed January 10, 1924. Serial No. 685,307.

*To all whom it may concern:*

Be it known that I, FRANK H. WASHKO, a citizen of the United States, and resident of Bedford, in the county of Cuyahoga and State of Ohio, have invented certain new and useful Improvements in Rims for Pneumatic Tires and Casings, of which I hereby declare the following to be a full, clear, and exact description, such as will enable others skilled in the art to which it appertains to make and use the same.

The invention relates to improvements in the construction of solid rims for automobile tires, and the objects of the invention are to provide means for making it possible to introduce the valve stem through the rim without splitting the rim, thus eliminating the difficulties heretofore experienced in attaching the tire to the rim and detaching it therefrom.

The invention comprises a rim having a lateral slotted opening which extends through the outer edge of the rim, thus permitting the tire to be sleeved over the rim by passing the valve stem directly into the slotted opening. It includes detachable means for closing the slotted opening to exclude dirt or dust, and to replace the material cut from the rim, so that the edges of the slotted opening can not become distorted or closed together.

It includes also the particular mode of construction of this filler member to correspond to the profile of the rim, so that the joints therewith will be practically indistinguishable and will not affect the use or appearance of the rim.

The advantages of this device are obvious in the simplicity of the operation of mounting and dismounting the tire casing and tube of a pneumatic tire and the ease with which it may be performed.

The invention is hereinafter further described, illustrated in the accompanying drawings and specifically pointed out in the claim.

In the accompanying drawings, Fig. 1 is a transverse section of the improved tire holding rim showing the position of the valve stem therein in dotted lines. Fig. 2 is a plan of the outer surface thereof when the parts are assembled. Fig. 3 is a similar view of the transversely slotted rim. Fig. 4 is a perspective of the slot cover and filler which leaves unbroken the periphery of the rim.

In these views, 1, is a solid rim, which may be clincher or straight side, as may be desired.

2, is a transverse slot in the outer edge of the rim the width of which corresponds substantially with the diameter of the valve stem and extends to the transverse center of the rim to permit the introduction of the valve stem by simply sleeving the tire over the rim, without tilting it, or contracting the rim, thus making the action extremely simple.

The tensile strength of the remaining uncut portion of the rim at, 3, is sufficient to bear the strain thereon since the slotted opening, 2, is afterwards filled with a metal part or filler, 4, of the same shape as the slot, and which may be the part cut or punched from the rim.

This part, 4, is inserted as the tire is put in place, and a thin cover plate, 5, passing an opening, 7, to receive the valve stem is placed over the same. This plate is riveted at, 6, or welded to the filler piece and slides between the tire edges and the outer face of the rim, thus preventing the entrance of dirt or dust through the slotted opening; also the filler preserves the shape of the rim and prevents the edge of the rim from becoming distorted or closed by hard usage upon the road.

The positions of the tire and valve stem are shown in dotted lines in Fig. 1.

Having described the invention what I claim as new and desire to secure by Letters Patent is—

A solid rim for a pneumatic tire provided with a transversely slotted opening in one edge thereof, for the introduction of the valve stem therein, a filler member insertable in said slotted opening, and a cover for said opening said cover and filler member being attached together and said cover insertable between said tire and rim.

In testimony whereof, I hereunto set my hand this 22d day of November, 1923.

FRANK H. WASHKO.

In presence of—
WM. M. MONROE,
CHAS. C. GOLDMAN.